(No Model.) 2 Sheets—Sheet 1.
A. H. ROWAN.
TRAMWAY.
No. 299,681. Patented June 3, 1884.
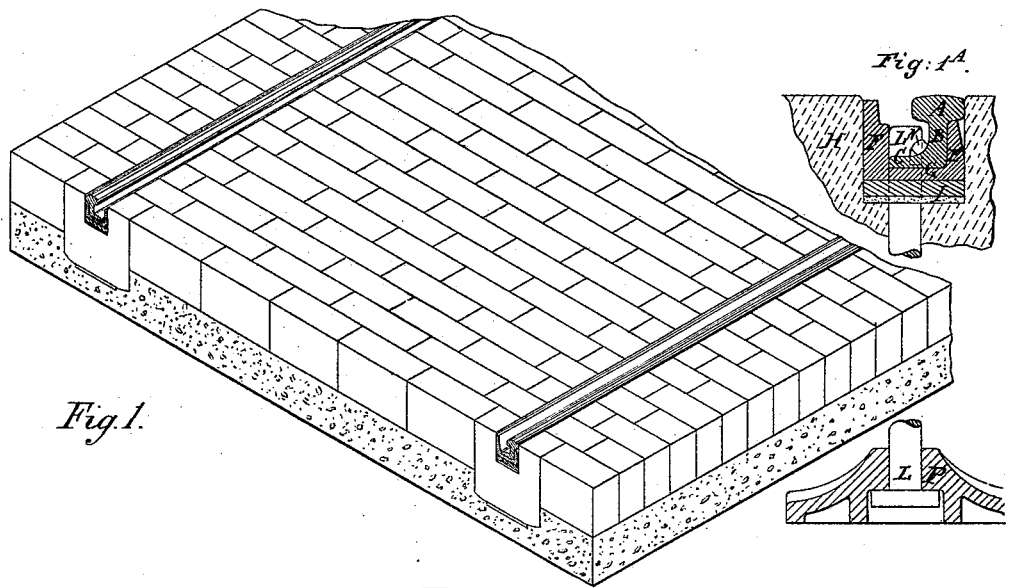
Fig. 1.
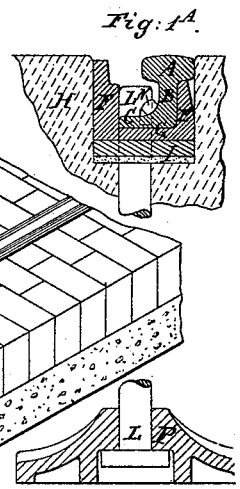
Fig. 1ᴬ.
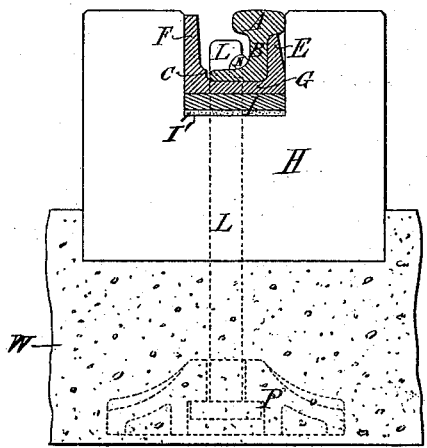
Fig. 5.
Fig. 5ª.
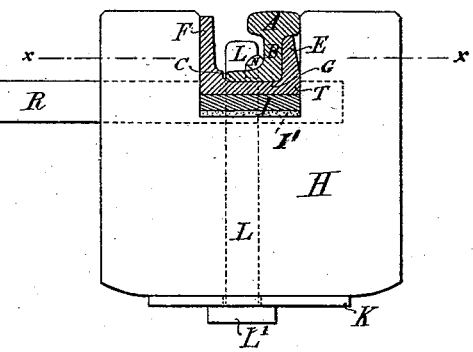
Fig. 2.
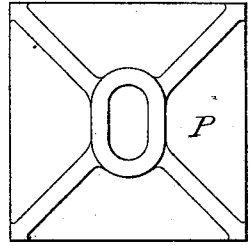
Fig. 6.
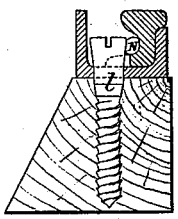
Fig. 2ᴮ.
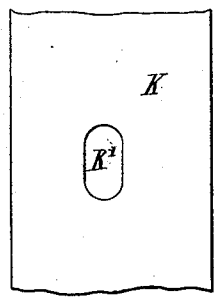
Fig. 2ᴬ.
Witnesses.
Jos. L. Glover
Sydney Hook
Inventor
Arthur H. Rowan (No Model.) 2 Sheets—Sheet 2.
A. H. ROWAN.
TRAMWAY.
No. 299,681. Patented June 3, 1884.
Fig. 4.
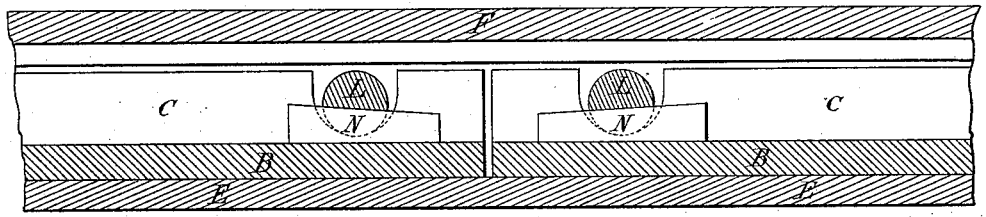
Fig. 7. Fig. 3.
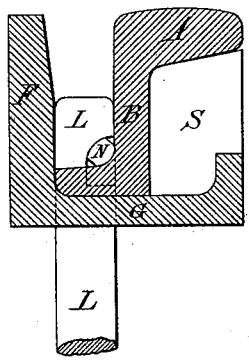 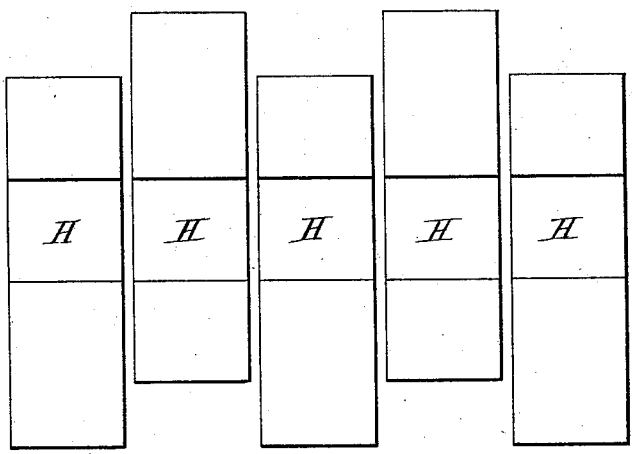
Fig. 8.
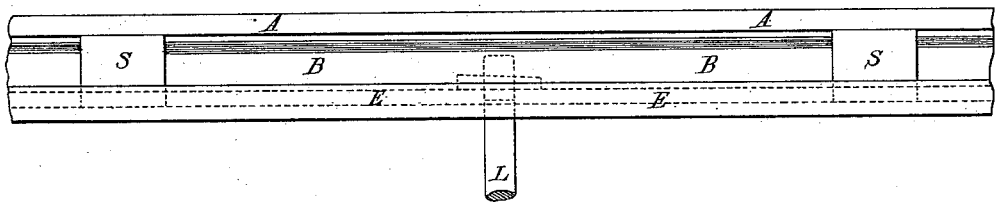
Witnesses. Inventor.

UNITED STATES PATENT OFFICE.

ARTHUR H. ROWAN, OF 6 WESTMINSTER CHAMBERS, COUNTY OF MIDDLESEX, ENGLAND.

TRAMWAY.

SPECIFICATION forming part of Letters Patent No. 299,681, dated June 3, 1884.

Application filed February 26, 1883. (No model.) Patented in England November 25, 1880, No. 4,911; in Belgium April 2, 1881, No. 54,278, and in Germany June 4, 1882, No. 20,432.

*To all whom it may concern:*

Be it known that I, ARTHUR HILL ROWAN, of 6 Westminster Chambers, in the county of Middlesex, England, civil engineer, a subject of Her Britannic Majesty, have invented certain new and useful Improvements in Tramways, (for some of which improvements I have obtained a patent in Great Britain, No. 4,911, bearing date November 25, 1880, and for some of which improvements I have obtained a patent in Belgium, No. 54,278, bearing date April 2, 1881, and for some of which improvements I have obtained a patent in Germany, No. 20,432, bearing date June 4, 1882;) and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to methods of constructing and laying tramway-rails and their supports and fastenings, so that a comparatively small quantity of the more costly material—steel—is used for those portions of the rails that are most subjected to strain and wear, and so that those portions can be readily removed and renewed without interfering with the paving or surface of the road in which the rails are laid.

My invention further relates to methods of forming those portions of the road which are immediately adjacent to the tram-rails, with the object of maintaining the surface of the road at those parts and the tram-rail rigidly in position relatively to one another.

The invention is fully illustrated in the accompanying drawings, in which Figure 1 is a perspective view; Fig. 1<sup>A</sup>, a vertical section; Fig. 2, a transverse section of one of the rails shown in Fig. 1, with its connections. Fig. 2<sup>A</sup> is a plan view of a portion; Fig. 3, a plan view; Fig. 4, a horizontal section on the line *x x* of Fig. 2, on a larger scale. Fig. 5 is a cross-section showing the anchor-plate in dotted lines. Fig. 5<sup>a</sup> is a detail. Fig. 6 is a plan view of the anchor-plate; and Figs. 7 and 8 show a modification, in which Fig. 7 is a cross-section, and Fig. 8 a side elevation. Fig. 2<sup>B</sup> is a cross-section of a modification.

The tram-rail is composed of two principal parts. One of these parts—which I call the "flange-rail"—is preferably of steel, and is rolled to a section corresponding generally with that shown in the accompanying drawings. It consists of a head, A, (see Fig. 2,) on which the wheels run, a vertical rib, B, and a flange, C, projecting wholly or principally on one side of the vertical rib. The other part of the tram-rail—which I call the "channel-rail," and which, for economy, may be of iron—consists of two sides or ribs, E and F, turned edge upward, and an intermediate horizontal portion, G. The side or rib E of the channel-rail is laterally in contact with the flange or vertical rib B of the flange-rail, and is housed beneath a projecting portion of the rail-head A, which latter the rib E may be made to support. The intermediate portion, G, of the channel-rail serves to support the flange-rail, the flange C of the latter lying in the channel in contact with the part G. The rib F of the channel-rail, when projecting upward to the height indicated in the drawings, forms a guard-rail at such a distance laterally from the inner edge of the head A of the flange-rail as to leave sufficient space for the flanges of the wheels. It also protects the pitching or pavement of the road from wear and keeps it in position.

H is a set or block of stone, wood, slag, or other material suitable for use for pitching or paving that portion of the surface of the road which is immediately adjacent to the tram-rails. I form in the upper face of each of the sets H a notch or recess of sufficient width to admit the tram-rail already described, and of sufficient depth to admit same, together with a strip of packing, I I', (when employed,) forming a cushion under the said tram-rail. This packing may be of wood, asphalt, or other material suitable for use as a packing or cushion, or both. I have shown two layers of the packing. The upper packing I, may be wood the lower layer, I', may be felt. Sets formed in this manner and arranged side by side, with the bottoms and sides of their notches or recesses in line, constitute a series of chairs affording the tram-rail support of a practically continuous character. The sets H are themselves underlaid by continuous or approximately continuous base-plates K, connected at frequent intervals with the tram-rails and breaking joint with them longitudinally. It will be seen that the tram-rail, sets, and base-plate formed, arranged, and connected together in the manner herein described not only assist and support one another in maintaining their proper relative positions, but constitute a tram-road possessing considerable weight, strength, and rigidity, while affording facilities for construction and maintenance. The gripping of the paving-sets between the tram-rail and the base-plate, resulting from the wedge or other adjustable fastening, forcing and tightening these two parts toward one another, and the consequent welding of the metal part of the road with a considerable portion of the surrounding paving into a comparatively rigid mass, are effects entirely absent from any existing system of constructing tramways with which I am acquainted.

For securing the tram-rail in position, I pass bolts, such as L, through the base-plate K, the lower end of the said bolt L being provided with a T-head, L', suitable for engaging with the base-plate K through a slot, K', therein. (See Fig. 2ᴬ.) The bolts L thence pass upward through holes in the horizontal portion G of the channel-rail, and through holes or notches in the flange C of the flange-rail, and present their upper ends in the space or groove for the wheel-flanges before referred to. Near the upper end of each of the bolts L is cut a lateral notch, M, into which is driven horizontally a taper key, N, which, bearing on the flange-rail, tightens the latter downward upon the part G of the channel-rail and sidewise against the vertical rib E thereof. At the same time the key N secures both flange-rail and channel-rail to the base-plate K, and consequently to the series of paving sets or chairs H, portions of which are embraced between the tram-rail and the base-plate.

In Fig. 2ᴮ is represented another method of securing tram-rails of the kind hereinbefore referred to. In this case a taper-headed coach-screw, spike-fang, or other bolt, l, is used to secure the channel-rail to the sleeper or other substructure, and the flange-rail having been introduced, a key, N, is driven horizontally between the side of the said fastening and the flange-rail. The part of the fastening against which the key N bears may be circular or polyhedral in transverse section. Upon tightening up the key the flange-rail is secured to the channel-rail and indirectly to the substructure, the channel-rail being at the same time drawn against the side or beneath the head of the fastening opposite to that on which the key is applied. In either form in which the invention is carried out the fastening is adjustable, and allows the slack to be taken up so soon as, in consequence of compression, decay, or other cause, the fastening becomes slack. In the form shown in Figs. 1ᴬ, 2, 4, 7, and 8 the key N, being tapered, may be driven in farther to tighten the fastening when it becomes loose. In the form shown in Fig. 2ᴮ the screw-bolt may be turned to sink the screw deeper into the material below, and thus tighten the fastening.

By arranging the notches or recesses in the upper face of the paving sets or chairs H toward one or other of the ends thereof, as is shown, for example, in Fig. 3, the ordinary paving-sets contiguous thereto break joint, and in a manner interlock with the special sets H, with the effect that the tram-rails, the adjacent sets H, and the ordinary paving-sets adjoining the latter all assist one another in maintaining their proper relative positions in the surface of the road.

Fig. 7 represents a transverse section, and Fig. 8 a side view, of an alternative or modified form of tram-rail constructed according to my invention. In this case blocks such as S, composed of iron, of compressed oak or other hard wood, or of other appropriate material, are at suitable intervals interposed between the side E of the channel-rail and the vertical rib B and head A of the flange-rail. These blocks are of the required height to carry the overhanging head A of the flange-rail.

When, owing to wear or other cause, it becomes necessary to remove the tram-rail, the keys N are driven back and out of the notches M, whereupon both the flange-rail and the channel-rail composing the said tram-rail, as well as the packing or cushion I, can be lifted without disturbing the paving or surface of the road.

In laying a tram-road constructed according to my invention, I arrange the points of separation of the flange-rails and channel-rails, respectively, so as to break joints, as shown (as regards the flange-rail) in Fig. 4, which is a horizontal section taken above the key N. The use of separate fish-plates at the joints is thus rendered unnecessary.

To facilitate the setting out of two lines of tram-rail at their required distance from one another, and to insure the maintenance of such gage, distance-pieces may be introduced at suitable intervals. I prefer to use flat bars for such distance-pieces, and to notch them at each end in the manner shown in Fig. 2, where R is a terminal portion of a tie-bar, and T is a notch to receive the tram-rail. The bars, standing on edge, pass between the paving-sets and interfere but little with the proper pitching of the roadway.

I introduce under the base-plate K a concrete longitudinal bearing, W. In constructing this longitudinal bearing I form in the ground a trench, and having placed suitable anchor-plates, P, Figs. 5 and 6, in position, and receiving the bolts L, I fill in the trench with concrete, the upper ends of the bolts L remaining exposed. While the concrete is still soft the sets or chairs H are placed in position and truly bedded in the as yet unset concrete. The packing or cushion I and channel-rail are next dropped over the exposed ends of the bolts L, and finally, after the concrete is thoroughly set, the flange-rail is introduced and secured by the key N in the manner already described.

In some instances the height of the concrete longitudinal may be increased, and the tram-rail with or without its packing or cushion I bedded direct thereon, the intervention of the chairs or sets H being dispensed with.

When the concrete W is employed, I can dispense with the continuous iron bearing K. I can use under the channel-plate, E F G, only one thickness of the packing material, as I.

Fig. 1^A shows the channel-plate and the bolt L so formed and arranged that when the wedge N is driven tightly, so as to exert a great force tending to break the bolt L at the point where it is weakened by the notch to receive N, said bolt will be supported on its opposite face by bearing firmly against the inner face of the rib F of the channel-plate. This is important, as contributing greatly to the strength, and the same construction is shown in the modification presented in Fig. 7; but this may be dispensed with in some cases, as indicated in Figs. 2 and 5.

I claim as my invention—

1. The flange-rail having the head A, vertical rib B, and base-flange C, in combination with the channel-rail E F G, having the rib F, extending upward, as shown, so as to form a guard-rail and protect the pitching, substantially as herein specified.

2. The combination, in a tram-road, of a tram-rail and a base-plate with intermediate channeled paving-sets H, secured together by removable fastenings, adjustable substantially as herein set forth.

3. The combination of the bolt L, projecting upward into the groove of the channel-rail E F G, with such channel-rail, and with the flange-rail A B C, operating substantially as herein set forth.

4. The combination, in a tram-road, substantially as described, of a channel-rail, E F G, flange-rail A B C, packing I I', and a base-plate, K, with intermediate paving-sets, H, all arranged substantially as set forth, and secured together by adjustable fastenings, as specified.

In testimony whereof I affix my signature in the presence of two witnesses.

ARTHUR H. ROWAN.

Witnesses:
    JOSH. GLOVER,
191 *Fleet Street, London.*
    SYDNEY HOOK,
50 *Gresham House, Old Broad Street, London.*